US012619548B2

(12) United States Patent
Zhang et al.

(10) Patent No.: US 12,619,548 B2
(45) Date of Patent: May 5, 2026

(54) APPARATUS AND METHOD FOR MOLECULAR DYNAMICS SIMULATION

(71) Applicant: SAMSUNG ELECTRONICS CO., LTD., Suwon-si (KR)

(72) Inventors: Zhen Zhang, Xi'an (CN); Jiali Pang, Xi'an (CN); Xiaohui Su, Xi'an (CN); Lin Chen, Xi'an (CN); Vasyltsov Ihor, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/944,463

(22) Filed: Nov. 12, 2024

(65) Prior Publication Data

US 2025/0156331 A1 May 15, 2025

(30) Foreign Application Priority Data

Nov. 13, 2023 (CN) .......................... 202311512383.6
Aug. 19, 2024 (KR) .......................... 10-2024-0110414

(51) Int. Cl.
*G06F 12/00* (2006.01)
*G06F 12/0875* (2016.01)

(52) U.S. Cl.
CPC ...... *G06F 12/0875* (2013.01); *G06F 2212/60* (2013.01)

(58) Field of Classification Search
CPC .......................... G06F 12/0875; G06F 2212/60
See application file for complete search history.

(56) References Cited

U.S. PATENT DOCUMENTS

2014/0257769 A1* 9/2014 Sakharnykh ........... G16C 10/00
703/2
2014/0344822 A1* 11/2014 Kini ...................... G06F 9/3851
718/103
2024/0161224 A1* 5/2024 Edwards ................. G06F 9/541

FOREIGN PATENT DOCUMENTS

CN 106407005 A 2/2017
CN 112069091 A 12/2020

OTHER PUBLICATIONS

Xu et al., Warped-Slicer: Efficient Intra-SM Slicing Through Dynamic Resource Partitioning for GPU Multiprogramming, available at: https://ieeexplore.ieee.org/document/7551396?source=IQplus (last visited Oct. 3, 2025) (Year: 2016).*

(Continued)

*Primary Examiner* — Craig S Goldschmidt
(74) *Attorney, Agent, or Firm* — NSIP Law

(57) ABSTRACT

Disclosed is an apparatus and method. The method includes generating dispatchable streams and binding the dispatchable streams one-to-one to cache slices, where the cache slices are pre-partitioned from an accelerated cache, and, for each of dispatchable streams binding a dispatchable kernel function, determined for a corresponding dispatchable stream, to the corresponding dispatchable stream, for a first cache slice, of the cache slices, first duplicating the dispatchable kernel function to the first cache slice and starting the first duplicated dispatchable kernel function with respect to the first cache slice, and for a second cache slice, of the cache slices, second duplicating the dispatchable kernel function to the second cache slice and starting the second duplicated dispatchable kernel function with respect to the second cache slice, wherein the starting of the first duplicated dispatchable kernel function is performed asynchronously with the starting of the second duplicated dispatchable kernel function.

21 Claims, 13 Drawing Sheets

(56) References Cited

OTHER PUBLICATIONS

Lammps. "7.4.3. KOKKOS package" [2024] www.docs.lammpos.
org Aug. 29, 2024 <https://docs.lammps.org/Speed_kokkos.html#>
10 pages.

Gayatri, Rahulkumar, et al. "Rapid exploration of optimization
strategies on advanced architectures using testsnap and lammps."
arXiv preprint arXiv:2011.12875 (Nov. 25, 2020). 10 pages.

Meyer, Ralf. "Efficient parallelization of short-range molecular
dynamics simulations on many-core systems." *Physical Review
E-Statistical, Nonlinear, and Soft Matter Physics* vol. 88 Iss.5 (Nov.
18, 2013): pp. 1-12.

* cited by examiner

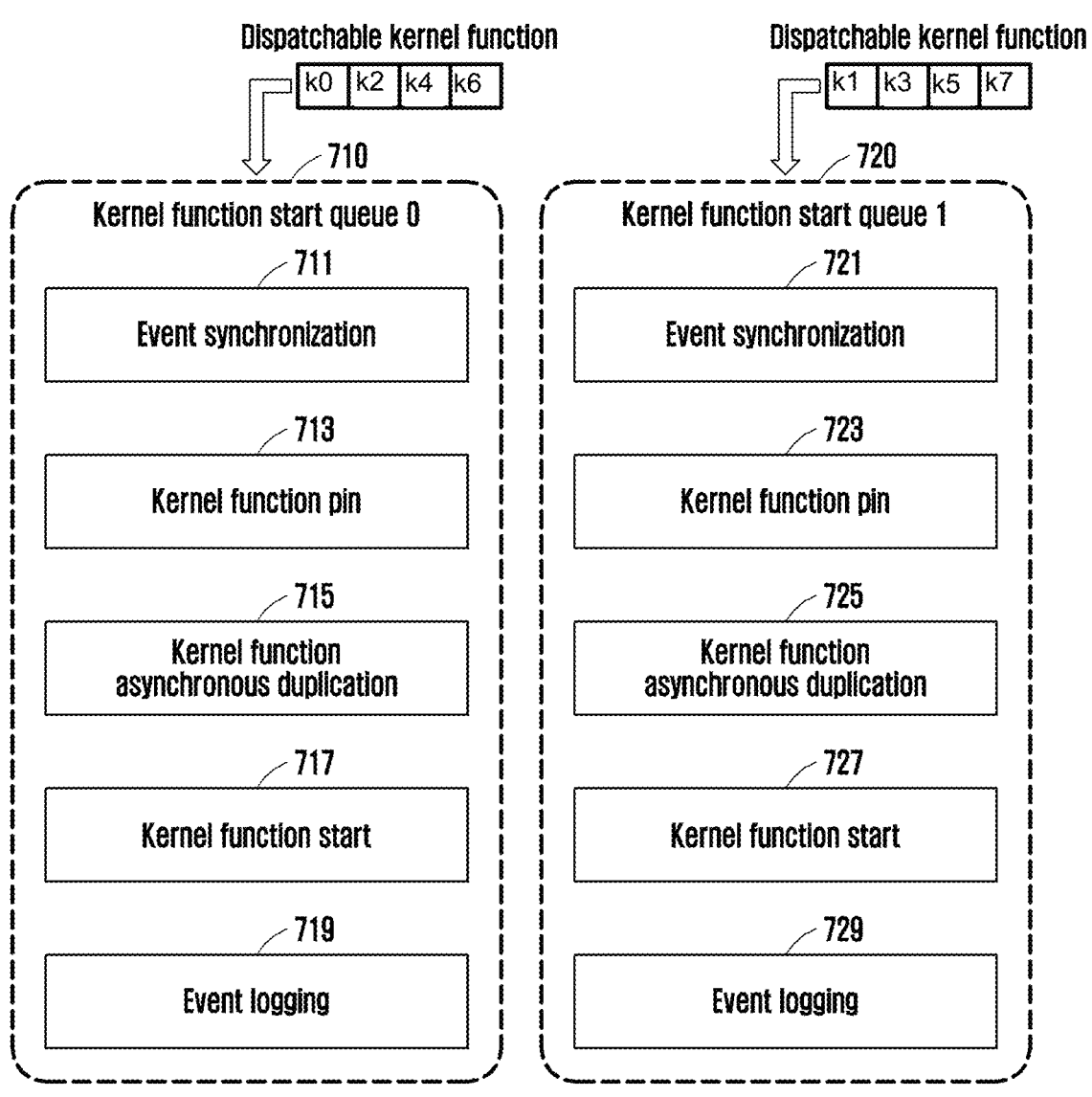

Dispatchable kernel function

| k0 | k2 | k4 | k6 |

710

Kernel function start queue 0

711

Event synchronization

713

Kernel function pin

715

Kernel function asynchronous duplication

717

Kernel function start

719

Event logging

Dispatchable kernel function

| k1 | k3 | k5 | k7 |

720

Kernel function start queue 1

721

Event synchronization

723

Kernel function pin

725

Kernel function asynchronous duplication

727

Kernel function start

729

Event logging

FIG. 7

APPARATUS AND METHOD FOR MOLECULAR DYNAMICS SIMULATION

CROSS-REFERENCE TO RELATED APPLICATIONS

This application claims the benefit under 35 USC § 119(a) of Chinese Patent Application No. 202311512383.6, filed on Nov. 13, 2023, in the China National Intellectual Property Administration, and Korean Patent Application No. 10-2024-0110414, filed on Aug. 19, 2024, in the Korean Intellectual Property Office, the entire disclosures of which are incorporated herein by reference for all purposes.

BACKGROUND

1. Field

The following description relates to an apparatus and method for molecular dynamics simulation.

2. Description of Related Art

Molecular dynamics (MD) simulation is a is a computational numerical approach to simulate and study structures and properties of a molecular system, such as by solving the equation of motion of the molecular system, based on classical mechanics, quantum mechanics, and/or statistical mechanics, as non-limiting examples. MD simulation is used in various scientific and technological fields such as chemistry, chemical engineering, materials science, engineering, physics, and biomedicine. MD simulation may obtain a motion trajectory of an atom and may observe various details during a motion process of the atom, so MD simulation may be a powerful complement to previous theoretical and experiment approaches.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes generating a plurality of dispatchable streams and binding the plurality of dispatchable streams one-to-one to a plurality of cache slices, where the plurality of cache slices are pre-partitioned from an accelerated cache, for each of the plurality of dispatchable streams binding a dispatchable kernel function, determined for a corresponding dispatchable stream, to the corresponding dispatchable stream, for a first cache slice, of the plurality of cache slices, first duplicating the bound dispatchable kernel function to the first cache slice and starting the first duplicated bound dispatchable kernel function with respect to the first cache slice, and for a second cache slice, of the plurality of cache slices, second duplicating the bound dispatchable kernel function to the second cache slice and starting the second duplicated bound dispatchable kernel function with respect to the second cache slice, wherein the starting of the first duplicated bound dispatchable kernel function is performed asynchronously with the starting of the second duplicated bound dispatchable kernel function.

The accelerated cache may include molecular dynamics (MD) data, and the dispatchable kernel function may be a kernel function among a plurality of kernel functions of a MD simulation.

The method may further include determining a size of each dispatchable kernel function among the plurality of kernel functions, and performing the pre-partitioning of the accelerated cache into the plurality of cache slices based on a determined largest size among the determined sizes.

A total number of the plurality of dispatchable streams may be same as a total number of the plurality of cache slices.

The binding of the dispatchable kernel function may include collecting all dispatchable kernel functions determined for the corresponding dispatchable stream and sequentially arranging the collected all dispatchable kernel functions in an execution order, and binding each of the collected all dispatchable kernel functions to the corresponding dispatchable stream sequentially according to the sequential arranging.

The method may further include generating a first event object for the first cache slice indicating whether the first cache slice is occupied by the first duplicated bound dispatchable kernel function, and generating a second event object for the second cache slices indicating whether the second cache slice is occupied by the second duplicated bound dispatchable kernel function.

The binding of the dispatchable kernel function may include binding each of a plurality of dispatchable kernel functions, determined for the corresponding dispatchable stream, to the corresponding dispatchable stream according to sequential execution order of the plurality of dispatchable kernel functions, and the method may further include, in response to the first cache slice being determined unoccupied based on the first event object indicating that the first cache slice is not occupied by the first duplicated bound dispatchable kernel function, duplicating, to the first cache slice, an unexecuted dispatchable kernel function that is directly subsequent to the first duplicated bound dispatchable kernel function in the sequential execution order of the plurality of dispatchable kernel functions.

The unexecuted dispatchable kernel function that is directly subsequent to the first duplicated bound dispatchable kernel function in the sequential execution order of the plurality of dispatchable kernel function may be determined at a very front of all remaining unexecuted dispatchable kernel functions, among the plurality of dispatchable kernel function, in a pageable memory, and the duplicating of the unexecuted dispatchable kernel function may include copying the unexecuted dispatchable kernel function from the pageable memory to a page-pinned memory, and duplicating, to the cache slice, the copied unexecuted dispatchable kernel function.

The method may further include marking the first event object of the first cache slice as being occupied in response to the duplicating, to the first cache slice, of the unexecuted dispatchable kernel function, and marking the first event object of the first cache slice as unoccupied in response to completion of an execution of the first duplicated bound dispatchable kernel function in response to the starting of the first duplicated bound dispatchable kernel function.

The starting of the second duplicated bound dispatchable kernel function may be performed in parallel with an execution of the first duplicated bound dispatchable kernel function in response to the starting of the first duplicated bound dispatchable kernel function.

In one general aspect, a non-transitory computer-readable storage medium is provided storing instructions that, when executed by a processor, cause the processor to perform any or any combination of the operations described herein.

In one general aspect, an apparatus includes one or more processors configured to generate a plurality of dispatchable streams and bind the plurality of dispatchable streams one-to-one to a plurality of cache slices, where the plurality of cache slices are pre-partitioned from an accelerated cache, and, for each of the plurality of dispatchable streams, bind a dispatchable kernel function, determined for a corresponding dispatchable stream, to the corresponding dispatchable stream, for a first cache slice, of the plurality of cache slices, perform a first duplicating of the bound dispatchable kernel function to the first cache slice and a starting of the first duplicated bound dispatchable kernel function with respect to the first cache slice, and for a second cache slice, of the plurality of cache slices, perform a second duplicating of the bound dispatchable kernel function to the second cache slice and a starting of the second duplicated bound dispatchable kernel function with respect to the second cache slice, where the starting of the first duplicated bound dispatchable kernel function is performed asynchronously with the starting of the second duplicated bound dispatchable kernel function.

The accelerated cache may include molecular dynamics (MD) data, and the dispatchable kernel function may be a kernel function among a plurality of kernel functions of a MD simulation.

The one or more processors may be further configured to determine a size of each dispatchable kernel function among the plurality of kernel functions, and perform the pre-partitioning of the accelerated cache into the plurality of cache slices based on a determined largest size among the determined sizes.

A total number of the plurality of dispatchable streams may be same as a total number of the plurality of cache slices.

For the binding of the dispatchable kernel function, the one or more processors may be configured to collect all dispatchable kernel functions determined for the corresponding dispatchable stream and sequentially arrange the collected all dispatchable kernel functions in an execution order, and bind each of the collected all dispatchable kernel functions to the corresponding dispatchable stream sequentially according to the sequential arranging.

The one or more processors may be further configured to generate a first event object for the first cache slice indicating whether the first cache slice is occupied by the first duplicated bound dispatchable kernel function, and generate a second event object for the second cache slices indicating whether the second cache slice is occupied by the second duplicated bound dispatchable kernel function.

For the binding of the dispatchable kernel function, the one or more processors may be configured to bind each of a plurality of dispatchable kernel functions, determined for the corresponding dispatchable stream, to the corresponding dispatchable stream according to sequential execution order of the plurality of dispatchable kernel functions, and the one or more processors may be further configured to, in response to the first cache slice being determined unoccupied based on the first event object indicating that the first cache slice is not occupied by the first duplicated bound dispatchable kernel function, duplicate, to the first cache slice, an unexecuted dispatchable kernel function that is directly subsequent to the first duplicated bound dispatchable kernel function in the sequential execution order of the plurality of dispatchable kernel functions.

The unexecuted dispatchable kernel function that is directly subsequent to the first duplicated bound dispatchable kernel function in the sequential execution order of the plurality of dispatchable kernel function may be determined at a very front of all remaining unexecuted dispatchable kernel functions, among the plurality of dispatchable kernel function, in a pageable memory, and, for the duplicating of the unexecuted dispatchable kernel function, the one or more processors may be configured to copy the unexecuted dispatchable kernel function from the pageable memory to a page-pinned memory, and duplicate, to the cache slice, the copied unexecuted dispatchable kernel function.

The one or more processors may be further configured to mark the first event object of the first cache slice as occupied in response to performance of the duplicating, to the first cache slice, of the unexecuted dispatchable kernel function, and mark the first event object of the first cache slice as unoccupied in response to completion of an execution of the first duplicated bound dispatchable kernel function in response to the starting of the first duplicated bound dispatchable kernel function.

The one or more processors may be configured to perform the starting of the second duplicated bound dispatchable kernel function in parallel with an execution of the first duplicated bound dispatchable kernel function that corresponds to the starting of the first duplicated bound dispatchable kernel function.

Other features and aspects will be apparent from the following detailed description, the drawings, and the claims.

BRIEF DESCRIPTION OF THE DRAWINGS

FIG. 7 illustrates an example asynchronous start of each dispatchable kernel function, according to one or more embodiments.

Figure 1:
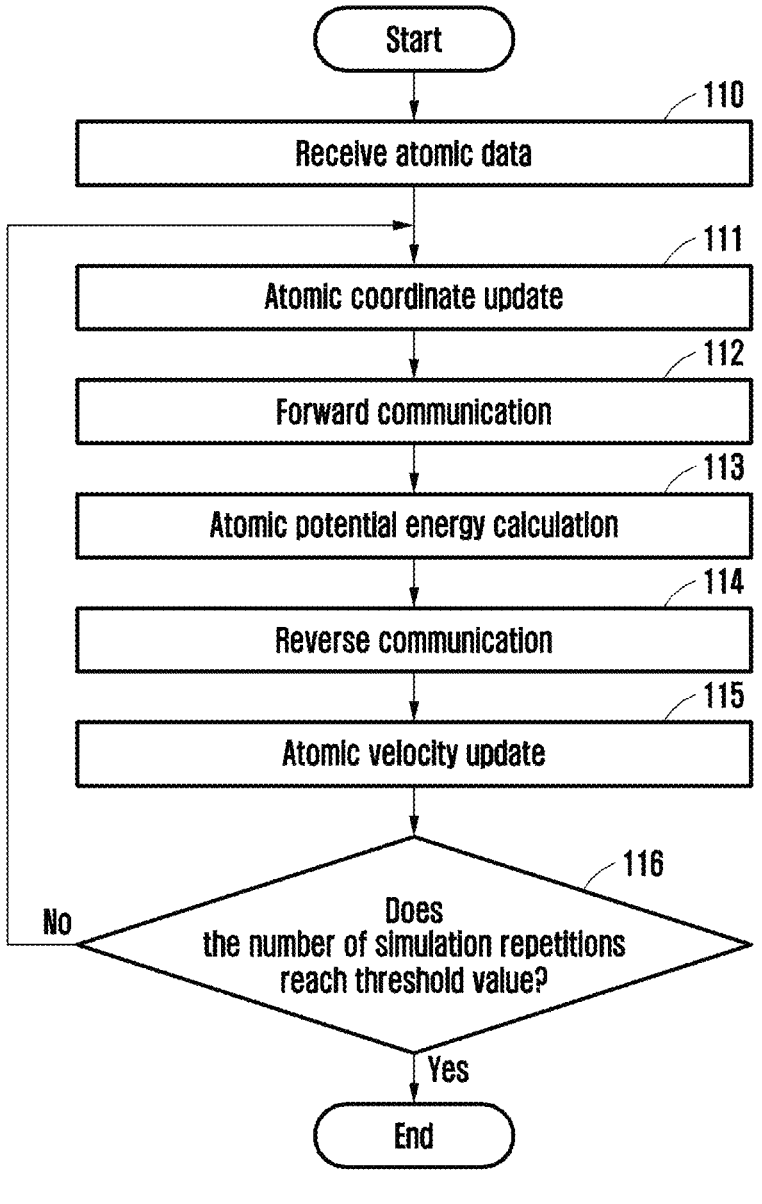
FIG. 1 illustrates an example molecular dynamics (MD) simulation process, according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing. As further examples, it is to be understood that if a component (e.g., a first component) is referred to, with or without the term "operatively" or "communicatively", as "coupled with," "coupled to," "connected with," or "connected to" another component (e.g., a second component), the component may be coupled with the other component directly (e.g., by wire), wirelessly, or via a third component.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

While data acceleration approaches have been applied to MD simulation to start a dispatchable kernel function based on a data stream, it is found that such approaches may waste a lot of time waiting between the starts of the dispatchable kernel functions.

FIG. 1 illustrates an example molecular dynamics (MD) simulation process, according to one or more embodiments.

Referring to FIG. 1, an electronic device may perform MD simulation to predict the movement of atoms and molecules in a material, such as by solving an equation of motion for the movement of atoms forming a material. As non-limiting examples, the electronic device may correspond to the electronic device 1200 of FIG. 12, the electronic device 1300 of FIG. 13, or the at least one processor 1310 of FIG. 13. For convenience of explanation the below descriptions of FIGS. 1-11, for example, may refer to 'the electronic device' but the electronic devices of the respective drawing descriptions may each be different or the same electronic devices (e.g., of the electronic device 1200 of FIG. 12, the electronic device 1300 of FIG. 13, or the at least one processor 1310 of FIG. 13) for any two, all, or other combinations of the drawing descriptions. As further non-limiting examples, as the corresponding processors of the electronic device, the electronic device may include a plurality of graphics processing units (GPUs) or GPU clusters and/or a plurality of central processing units (CPUs) or CPU clusters, either or both of which may be configured to perform some or all MD simulation operations as described herein and below.

In operation 110, the electronic device may receive atomic data. For example, the atomic data may include data such as the type, initial position, and/or velocity of/for one or more atoms.

In operation 111, the electronic device may update atomic coordinates based on the received atomic data.

In operation 112, the electronic device may execute forward communication and synchronize the atomic coordinates in multi-process parallel simulation.

In operation 113, the electronic device may perform an atomic potential energy calculation, based on a potential energy model, using the atomic coordinates as an input, and calculate atomic energy information.

In operation 114, the electronic device may perform reverse communication between a plurality of processes to synchronize the calculated atomic energy information with all processes.

In operation 115, the electronic device may update the atomic velocity based on the atomic energy information. Operations 111-115 may then be repeated.

In operation 116, the electronic device may determine whether the number of repetitions reaches a threshold value.

The electronic device may terminate the MD simulation in response to determining that the number of repetitions reaches the threshold value. The electronic device may repeat the performance of operations 111-115 in response to determining that the number of repetitions does not reach the threshold value.

As, or among other hardware, the electronic device may include one or more accelerators configured to perform any one or any combination of two or more of the MD simulation operations 111 through 115, as non-limiting examples, including or as well as any of the below operations described with respect to FIGS. 2-13. For example, the accelerators may be or include GPUs (or GPU clusters) and/or CPUs (or CPU clusters) but are not limited thereto. The electronic device may parse cache information of accelerated hardware and partition an accelerated cache into a plurality of cache slices. The electronic device may generate a plurality of dispatchable streams based on input atomic data and bind the plurality of dispatchable streams to the plurality of cache slices.

The electronic device may collect all dispatchable kernel functions from the MD simulation process and cross-bind each dispatchable kernel function to a corresponding dispatchable stream. The electronic device may process the corresponding dispatchable stream by duplicating each dispatchable kernel function to a corresponding cache slice and asynchronously starting each dispatchable kernel function. In this way, the electronic device may save computing time and improve the overall computing speed by overlapping the duplication time of different dispatchable kernel functions with the execution time of dispatched kernels.

Figure 2:
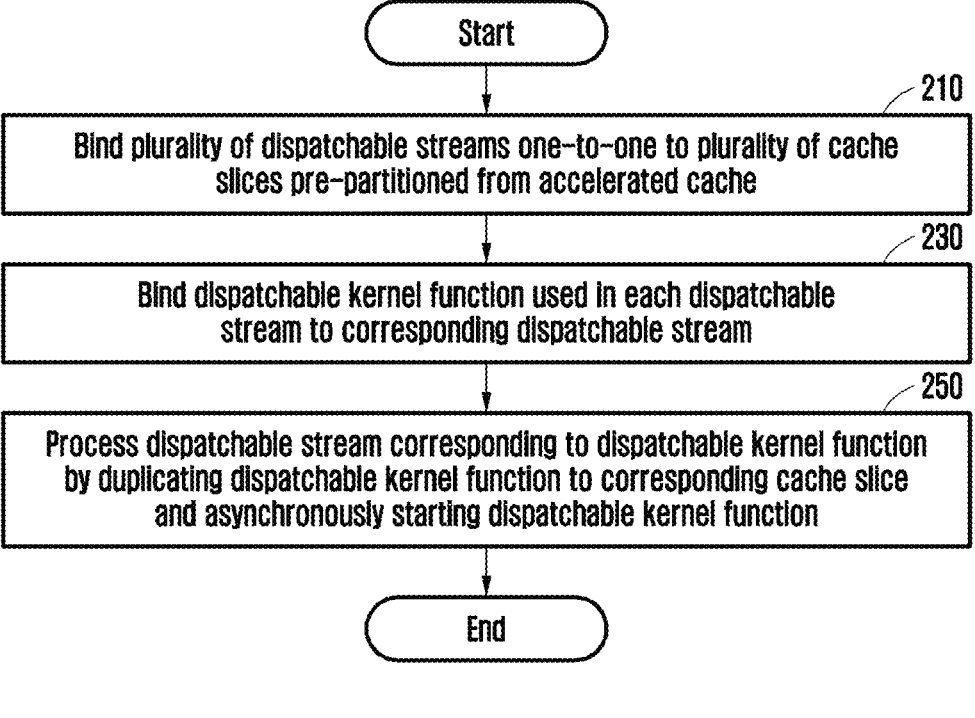
FIG. 2 illustrates an example molecular dynamics (MD) simulation process, according to one or more embodiments.

FIG. 2 illustrates an example molecular dynamics (MD) simulation process, according to one or more embodiments.

Referring to FIG. 2, each or any combination of the operations 210 to 250 may be performed by at least one processor as or of the electronic device. Operations 210 to 250 may be performed sequentially but are not limited thereto. For example, two or more operations may be performed in parallel.

In operation 210, the electronic device may generate a plurality of dispatchable streams and bind the plurality of dispatchable streams one-to-one to a plurality of cache slices pre-partitioned from an accelerated cache. In a non-limiting example, the size of the accelerated cache may be obtained by parsing information of the accelerated cache to partition the accelerated cache into the plurality of cache slices. For example, the size of the accelerated cache may be 64 kilobytes (KB), 128 KB, or 256 KB.

Figure 3:
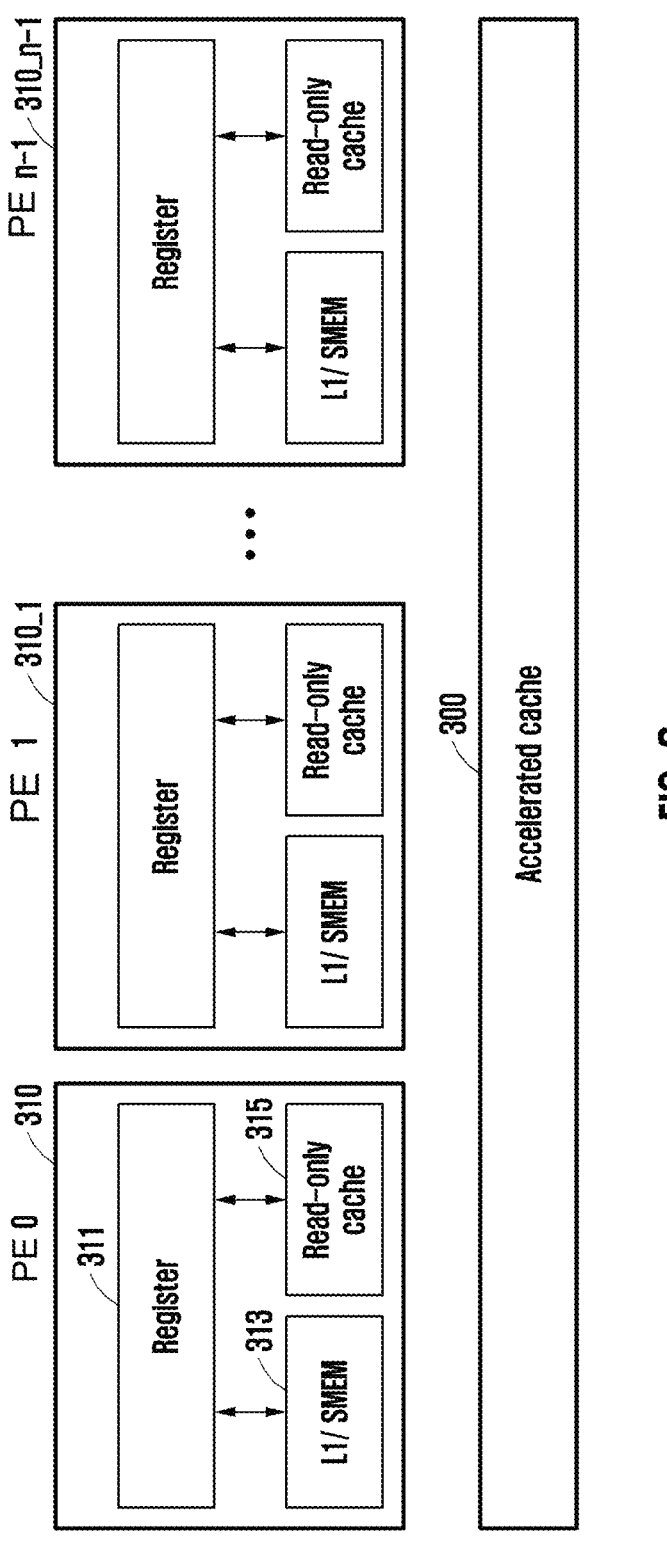
FIG. 3 illustrates an example architecture between an accelerated cache and processing elements, according to one or more embodiments.

FIG. 3 illustrates an example architecture between an accelerated cache and processing elements, according to one or more embodiments.

Referring to FIG. 3, processing elements (PEs) (e.g., PE 0 310, PE 1 310_1, and PE n−1 310_n−1) may be, but are not limited thereto, PEs (or processors) in a GPU (e.g., of the electronic device). n (e.g., n is an integer that is greater than 1) PEs (e.g., the PE 0 310, the PE 1 310_1, and the PE n−1 310_n−1) may share an accelerated cache 300. Each PE may include a read-only cache (e.g., a read-only cache 315), a level 1 (L1) cache/shared memory (SMEM) (e.g., L1/SMEM 313), and a register (e.g., a register 311) for storing data read from the accelerated cache 300 and performing cache acceleration. Each PE may perform a calculation based on the data read from the accelerated cache 300.

The electronic device may obtain the size of the accelerated cache 300, then obtain information of multiple or all dispatchable kernel functions used for data processing (e.g., MD simulation), and parse the size of each dispatchable kernel function. The electronic device may partition the accelerated cache 300 into a plurality of cache slices according to the sizes of multiple or all of the dispatchable kernel functions. The dispatchable kernel function may include a dispatchable kernel function used for MD simulation. The size of the dispatchable kernel function may refer to the size of a space (e.g., a space occupied by the dispatchable kernel function in the accelerated cache 300) occupied by the dispatchable kernel function. After parsing the size of the dispatchable kernel function, the electronic device may partition the accelerated cache 300 into the plurality of cache slices, based on the size of the largest dispatchable kernel function among the multiple or all of the dispatchable kernel functions. Here, the largest dispatchable kernel function may refer to, among the multiple or all of the dispatchable kernel functions, a dispatchable kernel function that occupies the largest space in the accelerated cache 300.

Figure 4A:
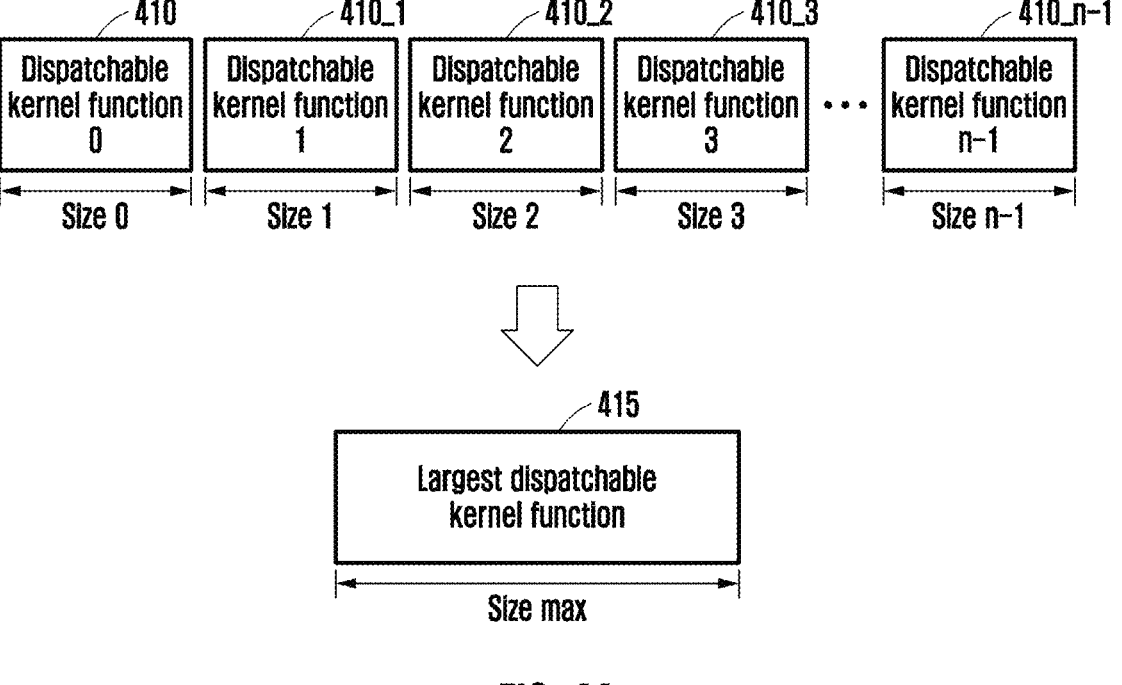
FIG. 4A illustrates an example parsing of a size of a dispatchable kernel function, according to one or more embodiments.
Figure 4B:
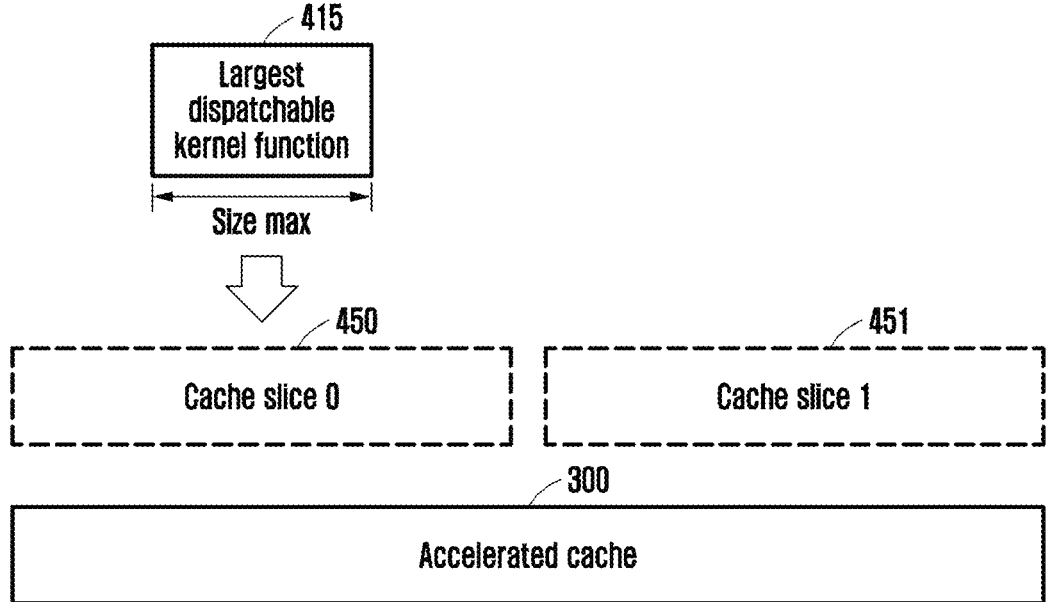
FIG. 4B illustrates an example partitioning of an accelerated cache into a cache slice, according to one or more embodiments.

FIG. 4A illustrates an example parsing of a size of a dispatchable kernel function, according to one or more embodiments, and FIG. 4B illustrates an example partitioning of an accelerated cache into a cache slice, according to one or more embodiments.

Referring to FIGS. 4A and 4B, the electronic device may parse the sizes of the multiple or all of the dispatchable kernel functions (e.g., dispatchable kernel function 0 410, dispatchable kernel function 1 410_1, dispatchable kernel function 2 410_2, dispatchable kernel function 3 410_3, and dispatchable kernel function n−1 410_n−1) to be executed in each MD simulation operation (e.g., the operations such as atomic coordinate update operation 111, forward communication operation 112, atomic potential energy calculation operation 113, reverse communication operation 114, and atomic velocity update operation 115). For example, the size of the dispatchable kernel function 0 410 may be Size 0, the size of the dispatchable kernel function 1 410_1 may be Size 1, and the size of the dispatchable kernel function n−1 410_n−1 may be Size n−1 (here, n is an integer that is greater than 1). The electronic device may determine the size of the largest dispatchable kernel function (e.g., a largest dispatchable kernel function 415) among multiple or all of the dispatchable kernel functions (e.g., the dispatchable kernel function 0 410, the dispatchable kernel function 1 410_1, the dispatchable kernel function 2 410_2, the dispatchable kernel function 3 410_3, and the dispatchable kernel function n−1 410_n−1). For example, the size of the largest dispatchable kernel function 415 may be determined to be Size max. The electronic device may partition the accelerated cache 300 into a plurality of cache slices, based on Size max, which is the size of the largest dispatchable kernel function (e.g., the largest dispatchable kernel function 415). The electronic device may partition the accelerated cache 300 into the plurality of cache slices having the size of Size max. For example, the size of cache slice 0 450 and the size of cache slice 1 451 may both be Size max, which is the size of the largest dispatchable kernel function 415.

The electronic device may partition input data into a plurality of dispatchable streams and generate the plurality of dispatchable streams. The number of the plurality of dispatchable streams may be the same as the number of the plurality of cache slices. Selectively, when the electronic device binds the plurality of dispatchable streams to the plurality of cache slices in a one-to-one correspondence, the electronic device may generate an event object corresponding to each cache slice. The electronic device may indicate whether each cache slice is occupied by a corresponding dispatchable kernel function, using the event object. The electronic device may ensure that the dispatchable kernel function corresponding to each dispatchable stream is sequentially executed.

Figure 5:
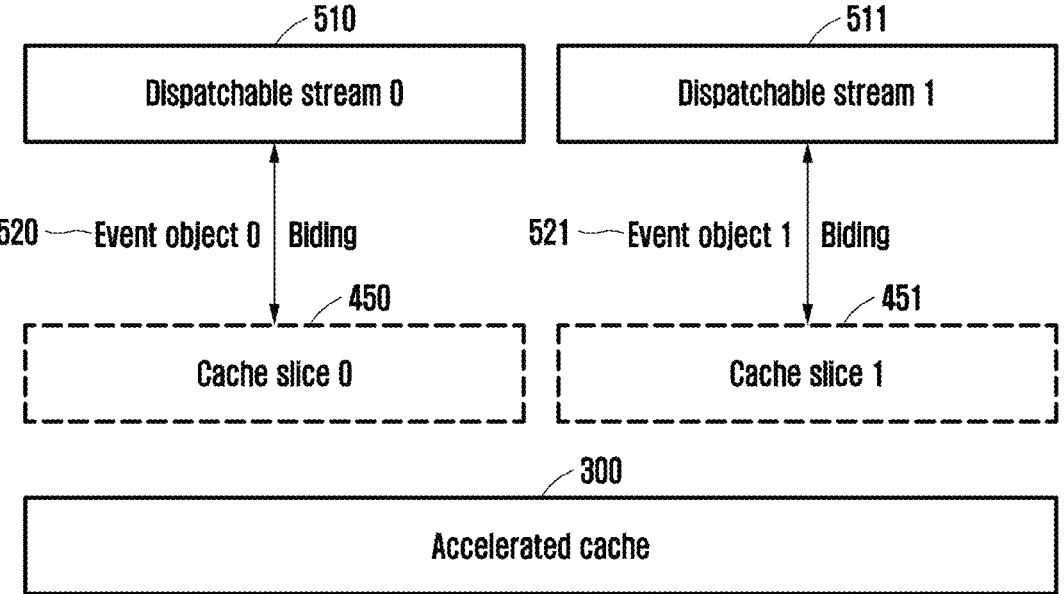
FIG. 5 illustrates an example binding of a plurality of dispatchable streams one-to-one to a plurality of cache slices, according to one or more embodiments.

FIG. 5 illustrates an example binding of a plurality of dispatchable streams one-to-one to a plurality of cache slices, according to one or more embodiments.

Referring to FIG. 5, the accelerated cache 300 may be partitioned into the cache slice 0 450 and the cache slice 1 451, dispatchable stream 0 510 may be bound to the cache slice 0 450, and dispatchable stream 1 511 may be bound to the cache slice 1 451. Event object 0 520 may indicate whether the cache slice 0 450 is occupied by a dispatchable kernel function, and event object 1 521 may indicate whether the cache slice 1 451 is occupied by the dispatchable kernel function.

Referring back to FIG. 2, in operation 230, the electronic device may bind the dispatchable kernel function used in each dispatchable stream to a corresponding dispatchable stream. Specifically, the electronic device may collect all dispatchable kernel functions to be executed in each MD simulation operation (e.g., the operations such as the atomic coordinate update operation 111, the forward communication operation 112, the atomic potential energy calculation operation 113, the reverse communication operation 114, and the atomic velocity update operation 115) and may sequentially arrange the multiple or all of the collected dispatchable kernel functions in the execution order. The electronic device may bind each dispatchable kernel function used in the same dispatchable stream to a corresponding dispatchable stream (e.g., a dispatchable stream in which the dispatchable kernel function is used) sequentially in the order (e.g., the execution order). The electronic device may implement cross-binding of a plurality of dispatchable kernel functions to the plurality of dispatchable streams.

Figure 6:
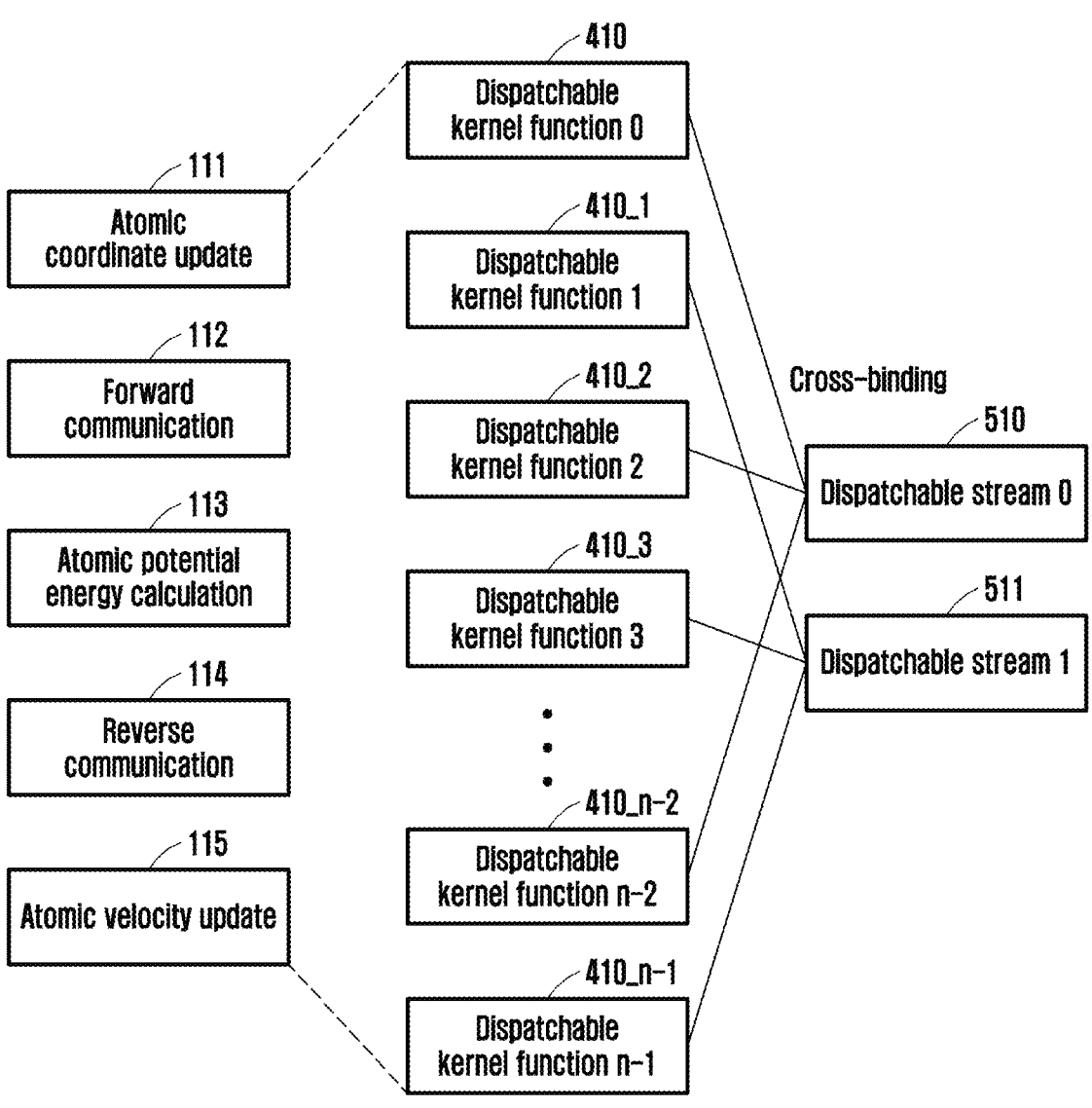
FIG. 6 illustrates an example cross-binding of a plurality of dispatchable kernel functions to corresponding dispatchable streams, according to one or more embodiments.

FIG. 6 illustrates an example cross-binding of a plurality of dispatchable kernel functions to corresponding dispatchable streams, according to one or more embodiments.

Referring to FIG. 6, for each MD simulation operation (e.g., the operations such as the atomic coordinate update operation 111, the forward communication operation 112, the atomic potential energy calculation operation 113, the reverse communication operation 114, and the atomic velocity update operation 115), n (here, n is an integer that is greater than 1) dispatchable kernel functions may be collected, and n dispatchable kernel functions may be sequentially arranged in the execution order. The electronic device may bind a dispatchable kernel function used in each dispatchable stream to a corresponding dispatchable stream, thereby allowing a plurality of dispatchable kernel functions to be bound to corresponding dispatchable streams. For example, the electronic device may sequentially bind, to the dispatchable stream 0 510, the dispatchable kernel function 0 410, the dispatchable kernel function 2 410_2, . . . , a dispatchable kernel function n−2 410_n−2 used in the dispatchable stream 0 510 and may sequentially bind, to the dispatchable stream 1 511, the dispatchable kernel function 1 410_1, the dispatchable kernel function 3 410_3, . . . , the dispatchable kernel function n−1 410_n−1 used in the dispatchable stream 1 511. Thereby the electronic device may realize cross-binding of the plurality of dispatchable kernel functions (e.g., the dispatchable kernel function 0 410, the dispatchable kernel function 1 410_1, the dispatchable kernel function 2 410_2, the dispatchable kernel function 3 410_3, and the dispatchable kernel function n−1 410_n−1) to the plurality of dispatchable streams (e.g., the dispatchable stream 0 510 and the dispatchable stream 1 511).

Referring back to FIG. 2, in operation 250, the electronic device may process a dispatchable stream corresponding to a dispatchable kernel function by duplicating the dispatchable kernel function to a corresponding cache slice and asynchronously starting the dispatchable kernel function. Specifically, the electronic device may process a corresponding dispatchable stream by duplicating each dispatchable kernel function to a corresponding cache slice and asynchronously starting each dispatchable kernel function, based on the binding of each dispatchable kernel function to the corresponding dispatchable stream and the binding of each dispatchable stream to the corresponding cache slice. Here, when any one dispatchable kernel function is duplicated to the corresponding cache slice, the one dispatchable kernel function may be started immediately regardless of whether other dispatchable kernel functions are to be duplicated to other cache slices. To implement the asynchronous start of the dispatchable kernel function, the electronic device may generate an event object indicating whether the corresponding cache slice is occupied for each cache slice.

The electronic device may duplicate, to a cache slice, an unexecuted dispatchable kernel function that is arranged at the very front of all dispatchable kernel functions (e.g., the very next in-sequence dispatchable kernel function among all remaining dispatchable streams that were originally bound the dispatchable stream in the execution order and which have not yet been duplicated to the cache slice) for the dispatchable stream in response to the cache slice being unoccupied by the dispatchable kernel function. The electronic device may duplicate, to the cache slice, the unexecuted dispatchable kernel function that is arranged at the very front of all remaining dispatchable kernel functions for the dispatchable stream in response to the event object of the cache slice to which the dispatchable stream is bound indicating that the cache slice is unoccupied. In the process of duplicating, to the cache slice (e.g., the cache slice 0 450 of FIG. 9B), the unexecuted dispatchable kernel function that is arranged at the very front (e.g., a dispatchable kernel function 920 of FIG. 9A) of all remaining dispatchable kernel functions, the electronic device may first duplicate the unexecuted dispatchable kernel function that is arranged at the very front (e.g., the dispatchable kernel function 920) of all the dispatchable kernel functions from a pageable memory (e.g., a pageable memory 910 of FIG. 9A of the electronic device) to a page-pinned memory (e.g., a page-pinned memory 930 of FIG. 9A of the electronic device) of a host (e.g., a host 900 of FIG. 9A of the electronic device) and then duplicate the unexecuted dispatchable kernel function (e.g., a dispatchable kernel function 921 of FIG. 9A) that is duplicated to the page-pinned memory (e.g., the page-pinned memory 930) again to the cache slice (e.g., the cache slice 0 450 of FIG. 9B). As a non-limiting example, the pageable memory 910 may only list remaining dispatchable kernel functions that have not yet been executed (e.g., upon completion of the duplication, starting, or completion of a dispatchable kernel function the same may be removed from the pageable memory 910). When the dispatchable kernel function (e.g., the dispatchable kernel function 920) is duplicated to the corresponding cache slice (e.g., the cache slice 0 450), the electronic device may mark (e.g., log) the event object of the corresponding cache slice (e.g., the cache slice 0 450) as occupied, and when the dispatchable kernel function (e.g., an illustrated dispatchable kernel function 922 of FIG. 9B representing the duplicated dispatchable kernel function 921) duplicated to the cache slice (e.g., the cache slice 0 450) completes execution, the electronic device may mark (e.g., tag) the event object of the corresponding cache slice (e.g., the cache slice 0 450) as unoccupied.

FIG. 7 illustrates an example asynchronous start of each dispatchable kernel function, according to one or more embodiments.

Referring to FIG. 7, with an accelerated cache (e.g., the accelerated cache 300) being partitioned into two cache slices (i.e., for non-limiting only explanatory purposes), cache slice 0 (e.g., the cache slice 0 450) and cache slice 1 (e.g., the cache slice 1 451), and the number of dispatchable streams being the same as the number of cache slices, two dispatchable streams, dispatchable stream 0 (e.g., the dispatchable stream 0 510) and dispatchable stream 1 (e.g., the dispatchable stream 1 511), may exist. Dispatchable kernel functions k0, k2, k4, and k6, which have been sequentially arranged in the execution order, may be used in the dispatchable stream 0 510, and dispatchable kernel functions k1, k3, k5, and k7, which have been sequentially arranged in the execution order, may be used in the dispatchable stream 1 511. The electronic device may set one kernel function start queue for each cache slice. For example, the electronic device may set kernel function start queue 0 710 corresponding to the cache slice 0 450 and kernel function start queue 1 720 corresponding to the cache slice 1 451. The kernel function start queue 0 710 may wait until the cache slice 0 450 occupied by previous dispatchable kernel functions (e.g., among the dispatchable kernel functions k0, k2, k4, and k6) for the dispatchable stream 0 510 is released. For example, a current stage of use of the kernel function start queue 0 710 may correspond to the illustrated event synchronization operation 711 of FIG. 7 until the cache slice 0 450 is released. The electronic device may determine whether the cache slice 0 450 is being occupied by the previous dispatchable kernel functions, based on the event object 0 520. For example, when a value of the event object 0 520 is logged as 1 (or instead 0), the fact that the cache slice 0 450 is occupied by the previous dispatchable kernel functions may be indicated or determined, and when a value of the event object 0 520 is logged as 0 (or instead 1), the fact that the previous dispatchable kernel functions have been released (i.e., no longer occupy) the cache slice 0 450 may be indicated or determined.

Figure 8:
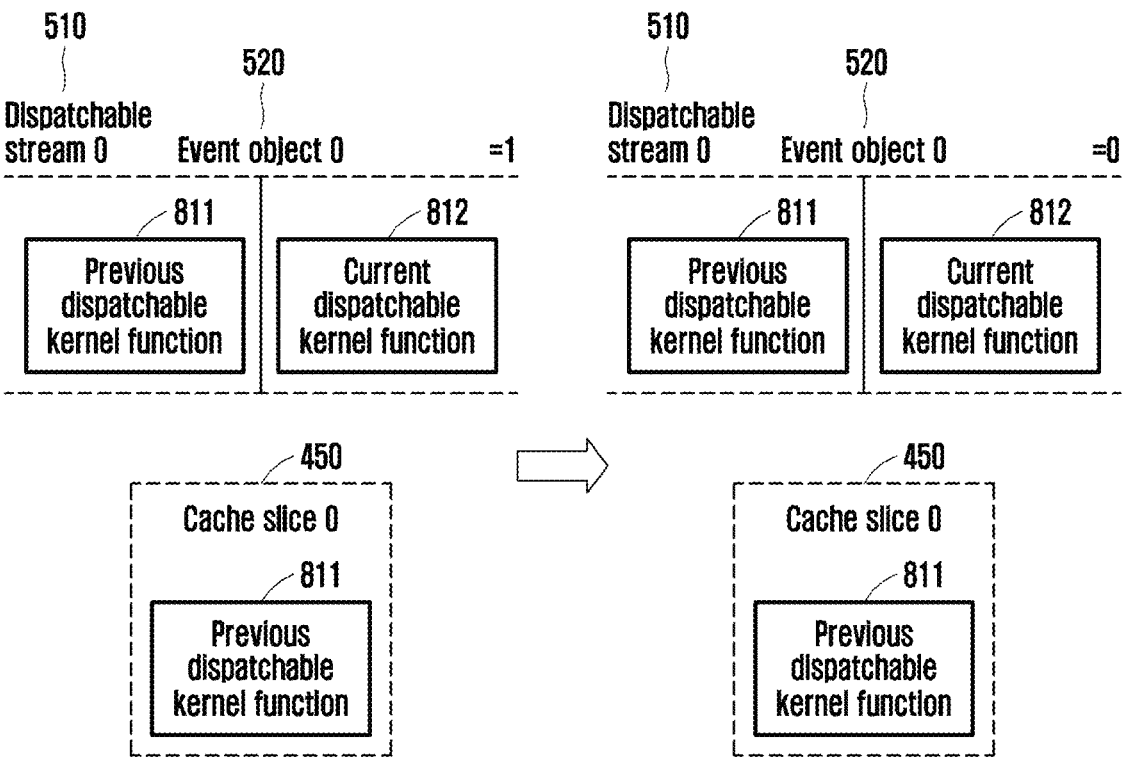
FIG. 8 illustrates an example event synchronization, according to one or more embodiments.

FIG. 8 illustrates an example of the event synchronization, according to one or more embodiments. The event synchronization may correspond to the illustrated event synchronization operation of FIG. 7.

Referring to FIG. 8, the cache slice 0 450 illustrated on the left side of FIG. 8 corresponds to a previous dispatchable kernel function 811 currently occupying the cache slice 0 450, which is indicated by a value of the event object 0 520 being logged as 1. The cache slice 0 450 illustrated on the right side of FIG. 8 corresponds to the previous dispatchable kernel function 811 having been released with respect to the cache slice 0 450 and the cache slice 0 450 being in a state that a current dispatchable kernel function 812 may occupy the cache slice 0 450, which is indicated by a value of the event object 0 520 being marked (e.g., tagged) as 0. When the cache slice 0 450 occupied by the previous dispatchable kernel function 811 used in the dispatchable stream 0 510 is released, the current dispatchable kernel function 812 (e.g., the dispatchable kernel function 920) may be duplicated from the pageable memory 910 to the page-pinned memory 930 of the host 900. When the current dispatchable kernel function 812 (e.g., the dispatchable kernel function 920) is duplicated to the page-pinned memory 930, a stage of use of the kernel function start queue 0 710 may correspond to the illustrated kernel function pin operation 713 of FIG. 7. Since a host operating system does not change the dispatchable kernel function (e.g., the current dispatchable kernel function 812 and the dispatchable kernel function 921) that is duplicated to the page-pinned memory 930, the dispatchable kernel function may be guaranteed not to be lost. The current dispatchable kernel function 812 (e.g., the dispatchable kernel function 921) that is duplicated to the page-pinned memory 930 may then be duplicated to the cache slice 0 450. When the current dispatchable kernel function 812 is duplicated to the cache slice 0 450, a stage of use of the kernel function start queue 0 710 may correspond to the illustrated kernel function asynchronous duplication operation 715 of FIG. 7 with respect to the current dispatchable kernel function 812.

Figure 9A:
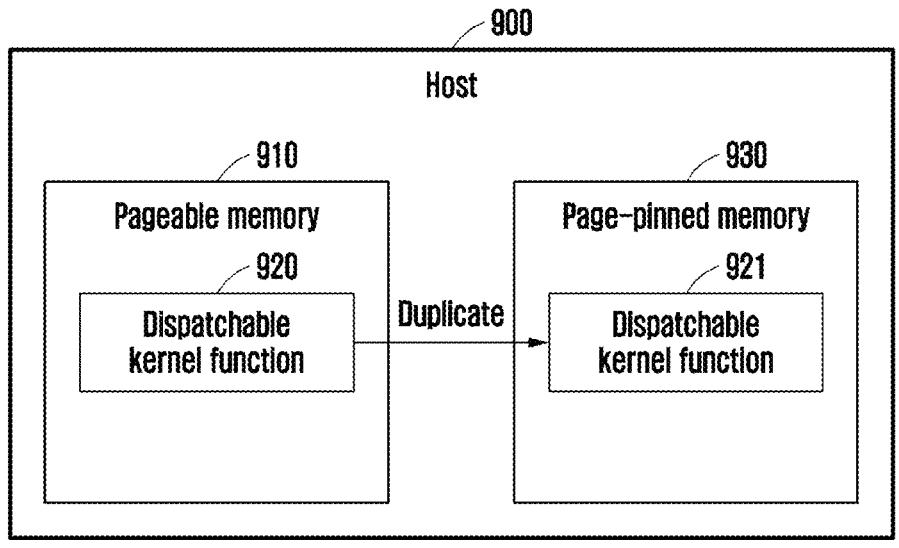
FIG. 9A illustrates an example duplicating of a dispatchable kernel function from a pageable memory to a page-pinned memory of a host, according to one or more embodiments.
Figure 9B:
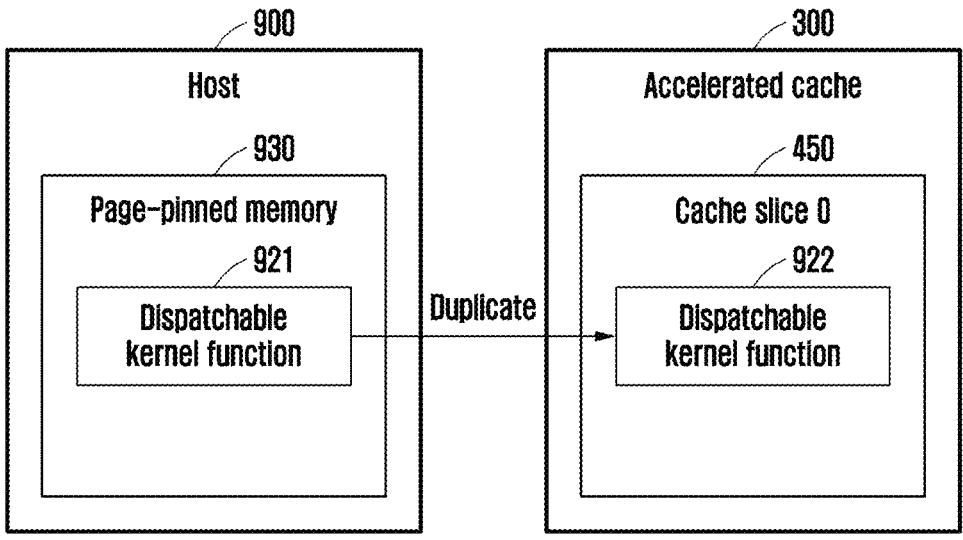
FIG. 9B illustrates an example duplicating of a dispatchable kernel function from a page-pinned memory of a host to a cache slice, according to one or more embodiments.
Figure 10:
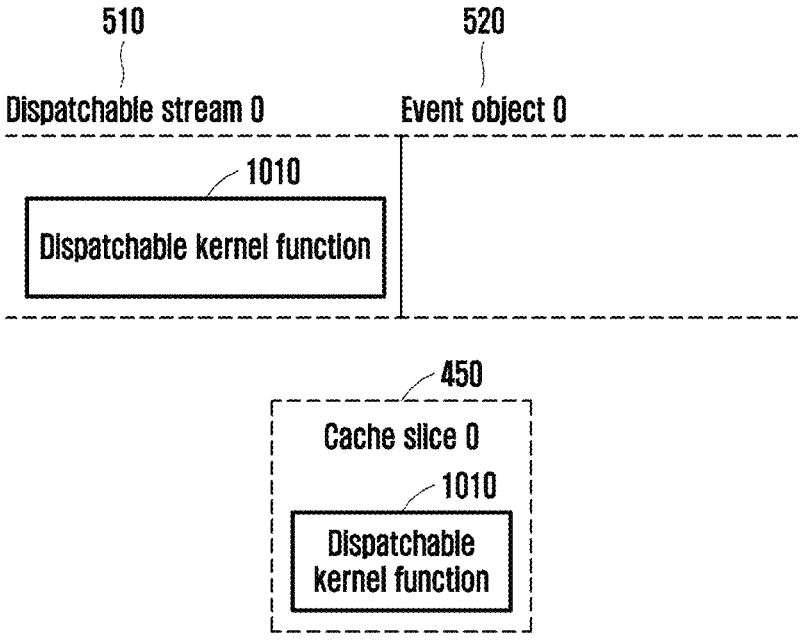
FIG. 10 illustrates an example logging of an event object according to a duplicating of a dispatchable kernel function to a cache slice, according to one or more embodiments.

FIG. 9A illustrates an example duplicating of a dispatchable kernel function from a pageable memory to a page-pinned memory of a host, according to one or more embodiments. FIG. 9B illustrates an example duplicating of a dispatchable kernel function from a page-pinned memory of a host to a cache slice, according to one or more embodiments. FIG. 10 illustrates an example kernel function start and event logging according to a duplicating of a dispatchable kernel function to a cache slice, according to one or more embodiments. The duplicating of FIGS. 9A and 9B and the kernel function start and event logging of FIG. 10 may respectively correspond to the kernel function asynchronous duplication operation 715, the kernel function start operation 717, and event logging operation 719 of FIG. 7.

Referring to FIGS. 9A to 10, the electronic device may process the dispatchable stream 0 510 by duplicating a current dispatchable kernel function to the cache slice 0 450 and then immediately starting the current dispatchable kernel function (e.g., the current dispatchable kernel function 812 of FIG. 8). This may correspond to a stage of use of the kernel function start queue 0 being the illustrated kernel function start operation 717 of FIG. 7 with respect to the current dispatchable kernel function 812. The electronic device may log a value of the event object 0 520 as 1 (or instead 0) at the same time of starting the current dispatchable kernel function 812 to indicate that the cache slice 0 450 is occupied by the current dispatchable kernel function 812. This may correspond to a stage of use of the kernel function start queue 0 being the illustrated event logging operation 719 of FIG. 7 with respect to the current dispatchable kernel function 812. The kernel function start queue 1 720 may execute event synchronization operation 721, a kernel function pin operation 723, kernel function asynchronous duplication operation 725, kernel function start operation 727, and event logging operation 729 in parallel with the operations of the kernel function start queue 0 710, and a repeated description thereof is omitted.

The electronic device may asynchronously duplicate dispatchable kernel functions (e.g., the dispatchable kernel functions k0 to k7) respectively belonging to different kernel function start queue from the page-pinned memory 930 of the host 900 respectively to different cache slices (e.g., asynchronously duplicating the dispatchable kernel functions that are respectively belonging to kernel function start queue 0 710 and the kernel function start queue 1 720 to the cache slice 0 450 or the cache slice 1 451) corresponding to the accelerated cache 300 so that the duplication time and the execution time of the dispatchable kernel functions used in different dispatchable streams may overlap each other, thereby saving computing time and improving the overall computing performance. Thus, the electronic device may improve the performance of MD simulation by cross-binding the plurality of dispatchable kernel functions to the corresponding dispatchable streams and starting each dispatchable kernel function through the plurality of kernel function start queues.

Figure 11:
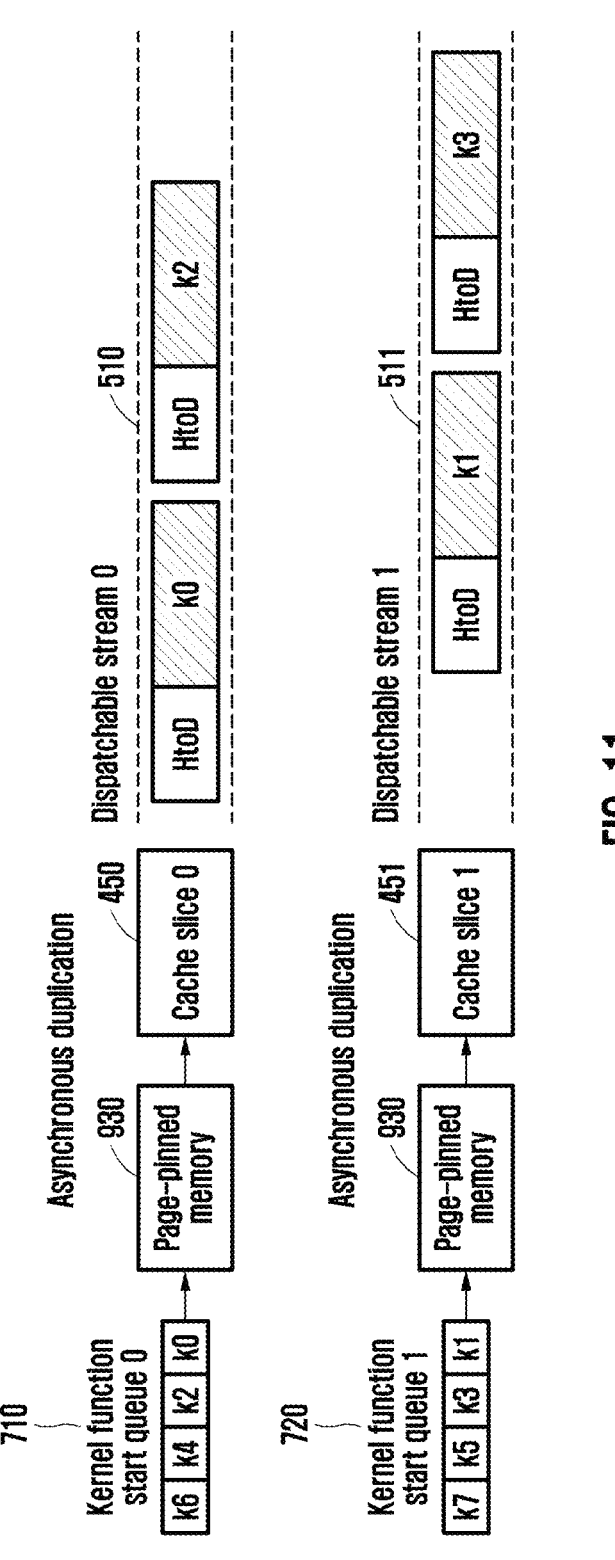
FIG. 11 illustrates an example operation in which a plurality of dispatchable kernel functions start in a plurality of kernel function start queues, according to one or more embodiments.

FIG. 11 illustrates an example operation in which a plurality of dispatchable kernel functions start in a plurality of kernel function start queues, according to one or more embodiments.

Referring to FIG. 11, the kernel function start queue 0 710 may include the dispatchable kernel functions k0, k2, k4, and k6 used in the dispatchable stream 0 510, and the kernel function start queue 1 720 may include the dispatchable kernel functions k1, k3, k5, and k7 used in the dispatchable stream 1 511. Each dispatchable kernel function (e.g., the illustrated dispatchable kernel functions k0, k2, k4, and k6 on the left side of FIG. 11) of the kernel function start queue 0 710 is duplicated from the page-pinned memory 930 of the host 900 to the cache slice 0 450 through asynchronous duplication, and each dispatchable kernel function (e.g., the illustrated dispatchable kernel functions k1, k3, k5, and k7 on the left side of FIG. 11) of the kernel function start queue 1 720 is duplicated from the page-pinned memory 930 of the host 900 to the cache slice 1 451 through asynchronous duplication. The right side of FIG. 11 represents the duplication and execution process of each dispatchable kernel functions k0, k2, k4, and k6 (e.g., with the respective duplication times "HtoD" and execution times of the dispatchable kernel functions k0 and k2 being illustrated on the right side of FIG. 11) for the dispatchable stream 0 510 and each dispatchable kernel function k1, k3, k5, and k7 (e.g., with the respective duplication times "HtoD" and the execution times of the dispatchable kernel functions k1 and k3 being illustrated on the right side of FIG. 11) for the dispatchable stream 1 511. The electronic device may execute different dispatchable streams (e.g., the dispatchable stream 0 510 and the dispatchable stream 1 511) in parallel by asynchronously duplicating (and starting) their respective kernel functions with overlapping duplication times HtoD and execution times of the respective dispatchable kernel functions of the dispatchable stream 0 510 and the dispatchable stream 1 511, thereby saving computing time.

Figure 12:
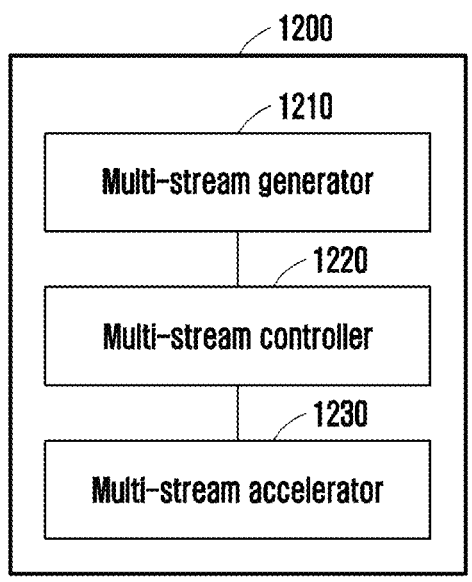
FIG. 12 illustrates an example electronic device, according to one or more embodiments.

FIG. 12 illustrates an example of an electronic device, according to one or more embodiments.

Referring to FIG. 12, an electronic device may include a multi-stream generator 1210, a multi-stream controller 1220, and a multi-stream accelerator 1230. The multi-stream generator 1210, the multi-stream controller 1220, and the multi-stream accelerator 1230 are illustrated as examples for describing the electronic device. Each of the multi-stream generator 1210, the multi-stream controller 1220, and the multi-stream accelerator 1230 are representative of one or more processors. Accordingly, the electronic device may include various variations of the multi-stream generator 1210, the multi-stream controller 1220, and the multi-stream accelerator 1230 as long as the operations of the electronic device described with reference to FIGS. 1 to 13 may be implemented. For example, two or more components may be combined, or one or more components may be added or omitted.

The multi-stream generator 1210 may generate a plurality of dispatchable streams. The multi-stream generator 1210 may bind the plurality of dispatchable streams one-to-one to a plurality of cache slices pre-partitioned from an accelerated cache (e.g., of the electronic device 1200 or another electronic device herein, as a non-limiting example). The multi-stream controller 1220 may bind a dispatchable kernel function used in each dispatchable stream to a corresponding dispatchable stream. The multi-stream accelerator 1230 may process a dispatchable stream corresponding to the dispatchable kernel function by duplicating the dispatchable kernel function to a corresponding cache slice and asynchronously starting (e.g., executing) the dispatchable kernel function.

The multi-stream generator 1210 may obtain information about multiple or all dispatchable kernel functions, parse the size of each dispatchable kernel function, and then partition the accelerated cache into the plurality of cache slices, based on the size of the largest dispatchable kernel function among multiple or all of the dispatchable kernel functions. For example, the multi-stream generator 1210 may partition the accelerated cache into the plurality of cache slices having the size of the largest dispatchable kernel function. The largest dispatchable kernel function may refer to a dispatchable kernel function that occupies the largest space among the multiple or all of the dispatchable kernel functions. The size (e.g., Size max) of the largest dispatchable kernel function may refer to the size of a space occupied by the largest dispatchable kernel function. In addition, the multi-stream generator 1210 may partition input data into the plurality of dispatchable streams. The number of dispatchable streams may be the same as the number of cache slices.

The multi-stream controller 1220 may collect the multiple or all of the dispatchable kernel functions for each dispatchable stream and sequentially arrange the multiple or all of the collected dispatchable kernel functions according to the execution order. The multi-stream controller 1220 may bind each dispatchable kernel function used in the same dispatchable stream to the corresponding dispatchable stream sequentially in the arrangement order.

The multi-stream accelerator 1230 may generate an event object indicating whether each cache slice is occupied by a corresponding dispatchable kernel function. In response to the cache slice being unoccupied by the dispatchable kernel function according to the event object, the multi-stream accelerator 1230 may duplicate, to a cache slice, an unexecuted dispatchable kernel function that is arranged at the very front of the multiple or all of the dispatchable kernel functions for the dispatchable stream. The multi-stream accelerator 1230 may duplicate the unexecuted dispatchable kernel function that is arranged at the very front of the multiple or all of the dispatchable kernel functions from a pageable memory (e.g., of the electronic device 1200 or another electronic device herein, as a non-limiting example) to a page-pinned memory of a host (e.g., of the electronic device 1200 or another electronic device herein, as a non-limiting example) and duplicate, to the cache slice, the unexecuted dispatchable kernel function duplicated to the page-pinned memory. Selectively, the multi-stream accelerator 1230 may mark the event object of the cache slice as occupied in response to the dispatchable kernel function being duplicated to the cache slice. The multi-stream accelerator 1230 may mark the event object of the cache slice as unoccupied in response to the completion of execution of the dispatchable kernel function that was duplicated to the cache slice. The multi-stream accelerator 1230 may immediately start any one duplicated dispatchable kernel function regardless of whether other dispatchable kernel functions are to be or are being duplicated to other cache slices in response to any one duplicated dispatchable kernel function being duplicated to a corresponding cache slice.

Figure 13:
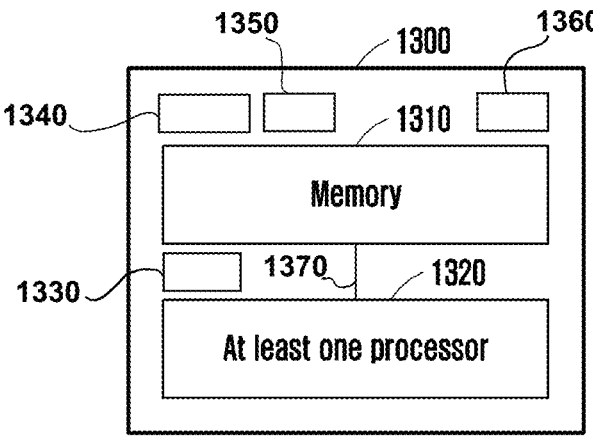
FIG. 13 illustrates an example electronic device, according to one or more embodiments.

FIG. 13 illustrates an example of an electronic device, according to one or more embodiments.

Referring to FIG. 13, the electronic device 1300 may include a memory 1310 and at least one processor 1320. The memory 1310 may store instructions (or coding or programs). For example, the instructions may include instructions for executing the operations of the at least one processor 1320 and/or the operations of one or more or each component of the at least one processor 1320. The instructions, when individually or collectively executed by the at least one processor 1320, may cause the electronic device 1300 to implement any one or any combination of all operations described herein.

The electronic device 1300 may include a personal computer (PC), a tablet device, a personal digital assistant (PDA), a smartphone, or other devices for executing the instructions described above. For example, the electronic device 1300 may be connected to a wired and/or wireless local area network (LAN) (e.g., through the LAN interface 1330). Here, the electronic device 1300 may be a single electronic device or a device or assembly of circuits, e.g., as a system, capable of executing the instructions individually or collectively. The electronic device 1300 may be, or be part of, an integrated control system or system administrator or may include a portable electronic device that communicates locally or remotely (e.g., via wireless transmission). The electronic device 1300 may further include a video display 1340 (e.g., a liquid crystal display (LCD)), a user interaction interface 1350 (e.g., an interface such as a keyboard, a mouse, or a touch input device), and input/output (I/O) interface 1360. All components of the electronic device 1300 may be connected to each other via a bus and/or a network 1370.

The memory 1310 may represent one or more non-transitory computer-readable storage media. The term "non-transitory" indicates that the storage medium is not embodied in a carrier wave or a propagated signal. However, the term "non-transitory" should not be interpreted to indicate that the memory 1310 is non-movable.

The memory 1310 may represent non-volatile storage elements (e.g., a magnetic hard disc, an optical disc, a floppy disc, flash memory, electrically programmable memory (EPROM), and electrically erasable and programmable (EEPROM)).

The memory 1310 is also representative of being integrated in or with the at least one processor 1320 by arranging, for example, random-access memory (RAM) or flash memory in a processor such as an integrated circuit microprocessor. The memory 1310 is also representative of the described caches, registers, pageable memories, and page-pinned memories, as non-limited examples, and accelerated caches, described herein. The memory 1310 is also representative of an independent device, such as an external disk drive, a storage array, or other storage devices that may be used by any database system. The memory 1310 and the at least one processor 1320 may also be operatively coupled or communicate through the input/output (I/O) interface 1360 or a network connection provided through the LAN interface 1330 so that the at least one processor 1320 may read code and/or instructions stored in the memory 1310.

The at least one processor 1320 may process data stored in the memory 1310. The at least one processor 1320 may be configured to execute instructions (e.g., computer-readable code or software) stored in the memory 1310 and instructions triggered by the at least one processor 1320 according to any combination of the above operations described with respect to FIGS. 1-13. The at least one processor 1320 may be a data-processing device implemented by hardware having circuits of a physical structure configured to execute such data processing operations. As non-limiting example, the at least one processor 1320 may include one or more processor cores, CPUs, GPUs, programmable logic devices, dedicated processor systems, microcontrollers, microprocessors, application-specific integrated circuits (ASICs), and/or field-programmable gate arrays (FPGAs). The at least one processor 1320 may further include, for example, but is not limited thereto, one or more analog processors, digital processors, microprocessors, multicore processors, processor arrays, and/or network processors.

The MD simulation processes, electronic devices, and corresponding a non-transitory computer-readable storage media described above may solve a problem of excessively long potential energy calculation time and long communication time between a plurality of computing units (e.g., GPUs, but are not limited to the GPUs) in the computer technology of large-scale MD simulation, such as by starting each kernel function in a multi-stream cross-start manner. The MD simulation processes, electronic devices, and corresponding a non-transitory computer-readable storage media described above may also be applicable to accelerate the processing of previous MD simulation approaches to greatly save computing time and greatly improve the computing performance using computing resources previous MD simulation approaches. Moreover, the MD simulation processes, electronic devices, and corresponding a non-transitory computer-readable storage media described above are beneficial to the research or generation of semiconductor materials because the same may greatly improve the performance of MD simulation in the existing environment.

The processors, processing elements, CPUs, GPUs, memories, caches, registers, pageable memories, and page-pinned memories described herein, including descriptions with respect to respect to FIGS. 1-13, are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both, and thus while some references may be made to a singular processor or computer, such references also are intended to refer to multiple processors or computers. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in, and discussed with respect to, FIGS. 1-13 that perform the operations described in this application are performed by computing hardware, for example, by one or more processors or computers, implemented as described above implementing instructions (e.g., computer or processor/processing device readable instructions) or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations. References to a processor, or one or more processors, as a non-limiting example, configured to perform two or more operations refers to a processor or two or more processors being configured to collectively perform all of the two or more operations, as well as a configuration with the two or more processors respectively performing any corresponding one of the two or more operations (e.g., with a respective one or more processors being configured to perform each of the two or more operations, or any respective combination of one or more processors being configured to perform any respective combination of the two or more operations).

Instructions or software to control computing hardware, for example, the one or more processors or computers described herein, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:

generating a plurality of dispatchable streams and binding the plurality of dispatchable streams one-to-one to a plurality of cache slices, where the plurality of cache slices are pre-partitioned from an accelerated cache; and binding a respective subset of a plurality of dispatchable kernel functions to each respective dispatchable stream of the plurality of dispatchable streams, and to the cache slice of the plurality of cache slices which is bound to the respective dispatchable stream;

for a first cache slice, of the plurality of cache slices, first duplicating a respective bound dispatchable kernel function bound to the first cache slice as a first duplicated bound dispatchable kernel function and starting the first duplicated bound dispatchable kernel function with respect to the first cache slice; and for a second cache slice, of the plurality of cache slices, second duplicating a respective bound dispatchable kernel function bound to the second cache slice as a second duplicated bound dispatchable kernel function and starting the second duplicated bound dispatchable kernel function with respect to the second cache slice, wherein the starting of the first duplicated bound dispatchable kernel function is performed asynchronously with the starting of the second duplicated bound dispatchable kernel function.

2. The method of claim 1, wherein the accelerated cache includes molecular dynamics (MD) data, and the plurality of dispatchable kernel functions are kernel functions of a MD simulation.

3. The method of claim 2, further comprising:

determining a size of each dispatchable kernel function among the plurality of kernel functions; and performing the pre-partitioning of the accelerated cache into the plurality of cache slices based on a determined largest size among the determined sizes.

4. The method of claim 3, wherein a total number of the plurality of dispatchable streams is same as a total number of the plurality of cache slices.

5. The method of claim 1, wherein the binding a respective subset of a plurality of dispatchable kernel functions to a respective dispatchable stream of the plurality of dispatchable streams comprises:

collecting all dispatchable kernel functions determined for the respective dispatchable stream and sequentially arranging the collected all dispatchable kernel functions in an execution order; and binding each of the collected all dispatchable kernel functions to the respective dispatchable stream sequentially according to the sequential arranging.

6. The method of claim 1, further comprising:

generating a first event object for the first cache slice indicating whether the first cache slice is occupied by the first duplicated bound dispatchable kernel function; and generating a second event object for the second cache slice indicating whether the second cache slice is occupied by the second duplicated bound dispatchable kernel function.

7. The method of claim 6, wherein the binding a respective subset of a plurality of dispatchable kernel functions to a respective dispatchable stream of the plurality of dispatchable streams comprises binding each of a plurality of dispatchable kernel functions, determined for the respective dispatchable stream, to the respective dispatchable stream according to sequential execution order of the plurality of dispatchable kernel functions, and wherein the method further comprises, in response to the first cache slice being determined unoccupied based on the first event object indicating that the first cache slice is not occupied by the first duplicated bound dispatchable kernel function, duplicating, to the first cache slice, an unexecuted dispatchable kernel function that is directly subsequent to the first duplicated bound dispatchable kernel function in the sequential execution order of the plurality of dispatchable kernel functions.

8. The method of claim 7, wherein the unexecuted dispatchable kernel function that is directly subsequent to the first duplicated bound dispatchable kernel function in the sequential execution order of the plurality of dispatchable kernel function is determined at a very front of all remaining unexecuted dispatchable kernel functions, among the plurality of dispatchable kernel function, in a pageable memory, and wherein the duplicating of the unexecuted dispatchable kernel function includes copying the unexecuted dispatchable kernel function from the pageable memory to a page-pinned memory, and duplicating, to the cache slice, the copied unexecuted dispatchable kernel function.

9. The method of claim 7, further comprising:

marking the first event object of the first cache slice as being occupied in response to the duplicating, to the first cache slice, of the unexecuted dispatchable kernel function; and marking the first event object of the first cache slice as unoccupied in response to completion of an execution of the first duplicated bound dispatchable kernel function in response to the starting of the first duplicated bound dispatchable kernel function.

10. The method of claim 1, wherein the starting of the second duplicated bound dispatchable kernel function is performed while the first duplicated bound dispatchable kernel function is executing.

11. A non-transitory computer-readable storage medium storing instructions that, when executed by a processor, cause the processor to perform the method of claim 1.

12. An apparatus, the apparatus comprising:

one or more processors configured to:

generate a plurality of dispatchable streams and bind the plurality of dispatchable streams one-to-one to a plurality of cache slices, where the plurality of cache slices are pre-partitioned from an accelerated cache; and bind a respective subset of a plurality of dispatchable kernel functions to each respective dispatchable stream of the plurality of dispatchable streams, and to the cache slice of the plurality of cache slices which is bound to the respective dispatchable stream;

for a first cache slice, of the plurality of cache slices, perform a first duplicating of a respective bound dispatchable kernel function bound to the first cache slice as a first duplicated bound dispatchable kernel function and a starting of the first duplicated bound dispatchable kernel function with respect to the first cache slice; and for a second cache slice, of the plurality of cache slices, perform a second duplicating of a respective bound dispatchable kernel function bound to the second cache slice as a second duplicated bound dispatchable kernel function and a starting of the second duplicated bound dispatchable kernel function with respect to the second cache slice, wherein the starting of the first duplicated bound dispatchable kernel function is performed asynchronously with the starting of the second duplicated bound dispatchable kernel function.

13. The apparatus of claim 12, wherein the accelerated cache includes molecular dynamics (MD) data, and the plurality of dispatchable kernel functions are kernel functions of a MD simulation.

14. The apparatus of claim 13, wherein the one or more processors are further configured to:

determine a size of each dispatchable kernel function among the plurality of kernel functions; and perform the pre-partitioning of the accelerated cache into the plurality of cache slices based on a determined largest size among the determined sizes.

15. The apparatus of claim 14, wherein a total number of the plurality of dispatchable streams is same as a total number of the plurality of cache slices.

16. The apparatus of claim 12, wherein, for the binding a respective subset of a plurality of dispatchable kernel functions to a respective dispatchable stream of the plurality of dispatchable streams, the one or more processors are configured to:

collect all dispatchable kernel functions determined for the respective dispatchable stream and sequentially arrange the collected all dispatchable kernel functions in an execution order; and bind each of the collected all dispatchable kernel functions to the respective dispatchable stream sequentially according to the sequential arranging.

17. The apparatus of claim 12, wherein the one or more processors are further configured to:

generate a first event object for the first cache slice indicating whether the first cache slice is occupied by the first duplicated bound dispatchable kernel function; and generate a second event object for the second cache slice indicating whether the second cache slice is occupied by the second duplicated bound dispatchable kernel function.

18. The apparatus of claim 17, wherein, for the binding a respective subset of a plurality of dispatchable kernel functions to a respective dispatchable stream of the plurality of dispatchable streams, the one or more processors are configured to bind each of a plurality of dispatchable kernel functions, determined for the respective dispatchable stream, to the respective dispatchable stream according to sequential execution order of the plurality of dispatchable kernel functions, and wherein the one or more processors are further configured to, in response to the first cache slice being determined unoccupied based on the first event object indicating that the first cache slice is not occupied by the first duplicated bound dispatchable kernel function, duplicate, to the first cache slice, an unexecuted dispatchable kernel function that is directly subsequent to the first duplicated bound dispatchable kernel function in the sequential execution order of the plurality of dispatchable kernel functions.

19. The apparatus of claim 18, wherein the unexecuted dispatchable kernel function that is directly subsequent to the first duplicated bound dispatchable kernel function in the sequential execution order of the plurality of dispatchable kernel function is determined at a very front of all remaining unexecuted dispatchable kernel functions, among the plurality of dispatchable kernel function, in a pageable memory, and wherein, for the duplicating of the unexecuted dispatchable kernel function, the one or more processors are configured to copy the unexecuted dispatchable kernel function from the pageable memory to a page-pinned memory, and duplicate, to the cache slice, the copied unexecuted dispatchable kernel function.

20. The apparatus of claim 18, wherein the one or more processors are further configured to:

mark the first event object of the first cache slice as occupied in response to performance of the duplicating, to the first cache slice, of the unexecuted dispatchable kernel function; and mark the first event object of the first cache slice as unoccupied in response to completion of an execution of the first duplicated bound dispatchable function in response to the starting of the first duplicated bound dispatchable kernel function.

21. The apparatus of claim 12, wherein the one or more processors are configured to perform the starting of the second duplicated bound dispatchable kernel function while the first duplicated bound dispatchable kernel function is executing.

\* \* \* \* \*